Dec. 2, 1952 W. J. DOBKIN 2,619,914
SOAP DISPENSING VALVE
Filed Oct. 11, 1946 2 SHEETS—SHEET 1
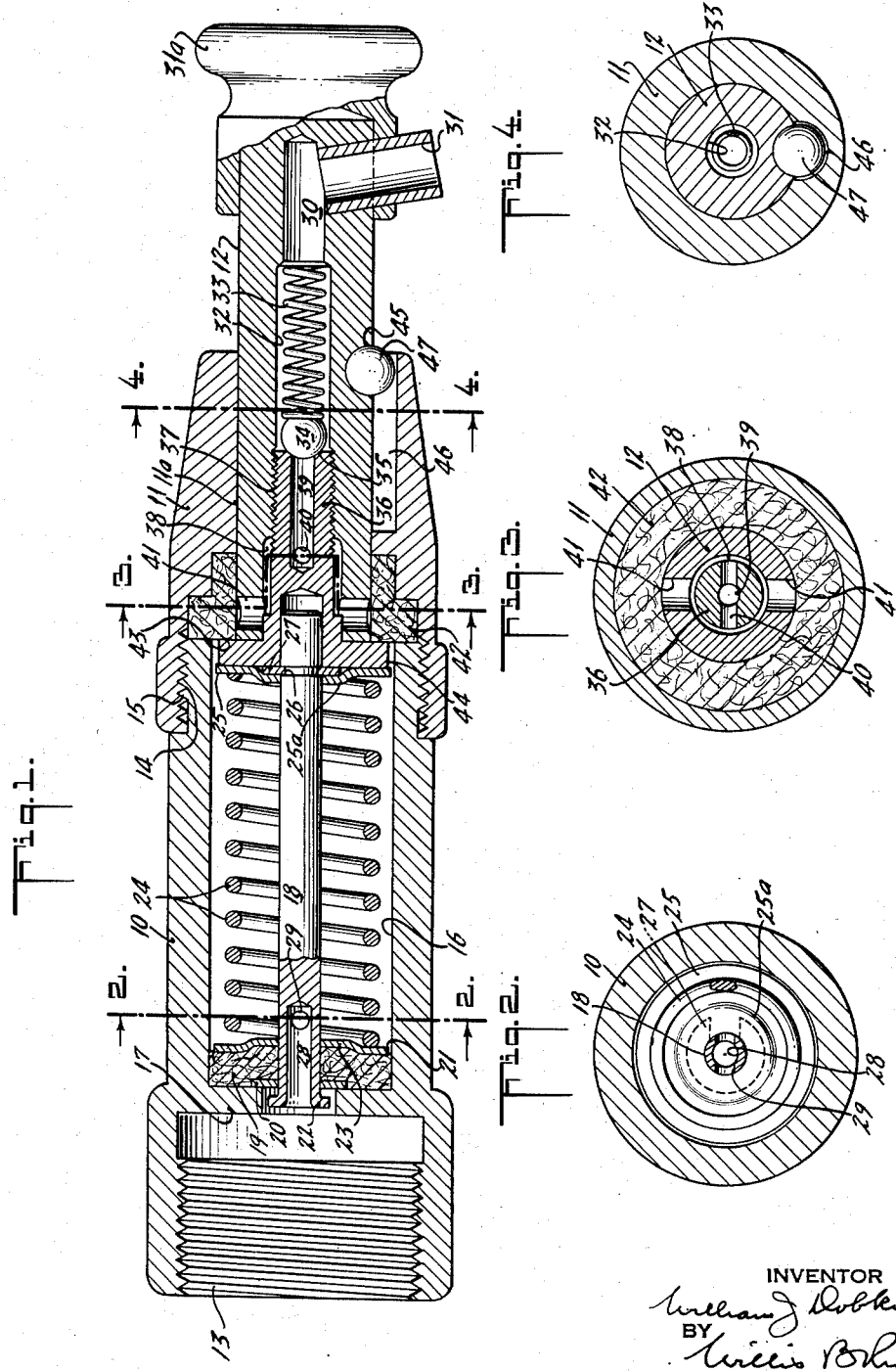
INVENTOR
William J. Dobkin
BY
Willis B. Rice
ATTORNEY Dec. 2, 1952 W. J. DOBKIN 2,619,914
SOAP DISPENSING VALVE
Filed Oct. 11, 1946 2 SHEETS—SHEET 2
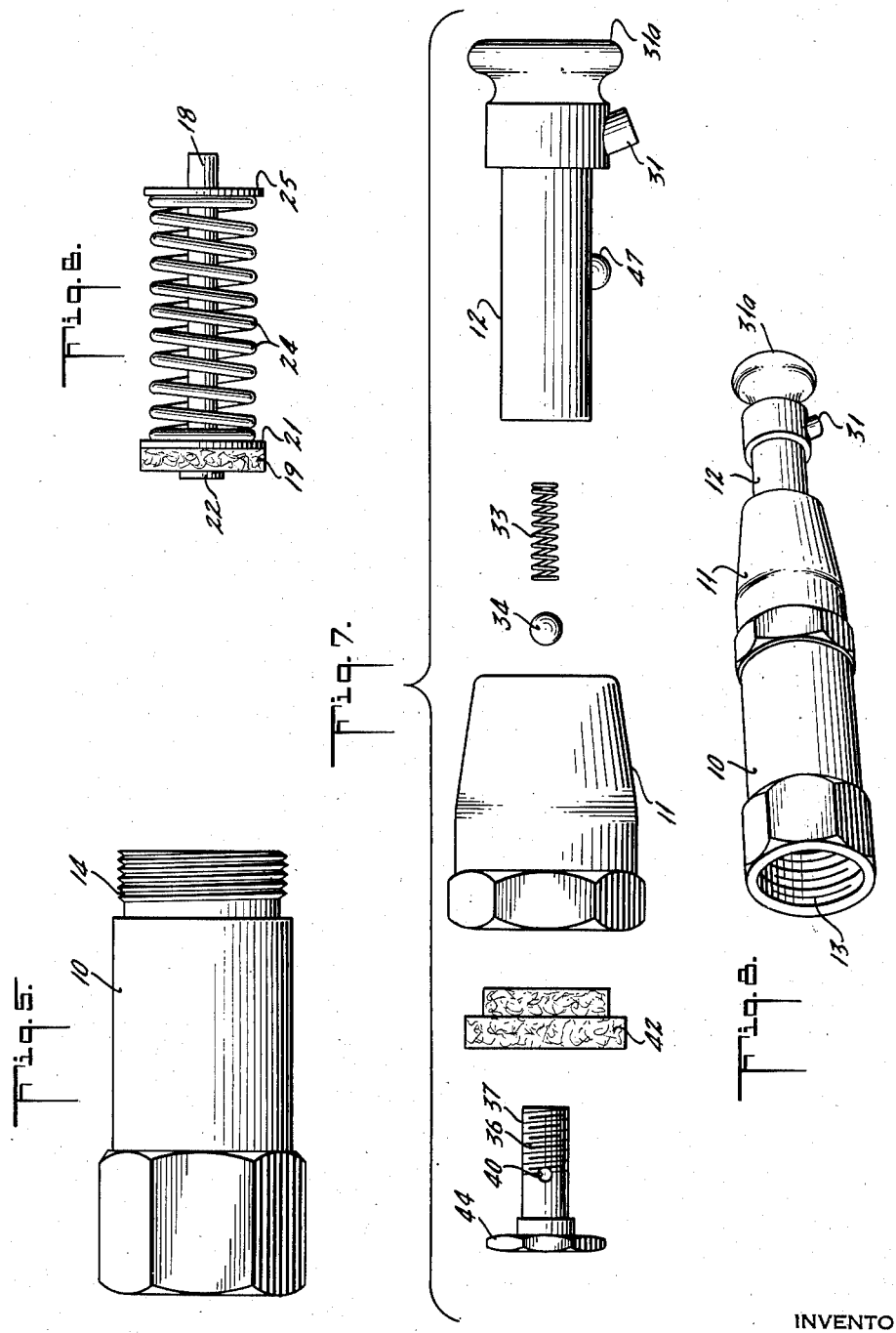
INVENTOR
William J. Dobkin
BY
Willis B Lee
ATTORNEY Patented Dec. 2, 1952

2,619,914

UNITED STATES PATENT OFFICE 2,619,914

SOAP DISPENSING VALVE

William J. Dobkin, Jackson Heights, N. Y., assignor to Mac. B. Feinson, New York, N. Y.

Application October 11, 1946, Serial No. 702,699

15 Claims. (Cl. 103—166.5)

1

This invention relates to a liquid soap dispensing valve such as is commonly used in a lavatory or the like, in which a soap supply is located at a distant point, and the soap is fed to the valve through a pipe connection.

It is an object of this invention to provide a soap valve of the character described in which the main operative parts are made as subassemblies which may be handled, stocked, repaired, and interchanged as such, and which can be assembled together to form a complete valve with a minimum of labor, and of which the working parts can be easily examined and repaired.

It is a further object to provide a valve of the character described in which the parts so subassembled may be brought into perfect alignment and operative relation by the mere act of assembling, without the need of adjustments.

It is a further object to provide a valve of the character described in which the separation of the subassemblies and the dis-assembling of any or all of them may be accomplished with ease and with a minimum of tools.

It is a further object to provide a device of the character described which will not clog in operation, which will dispense a certain quantity of soap with each stroke of the plunger, and which will neither leak nor drip.

It is a further object to provide a valve in which the working parts may be easily removed or replaced, without removing the main body of the valve from the pipe connection.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which:

Fig. 1 is a longitudinal section through a valve of this invention. Figs. 2, 3, and 4 are respectively, cross-sections on the lines 2—2, 3—3, and 4—4, of Fig. 1. Fig. 5 is an elevation of the base portion of the valve. Fig. 6 is an elevation of the spring assembly, Fig. 7 is an exploded view of the plunger portion, and Fig. 8 is a perspective view of the complete valve.

The valve comprises primarily a base 10 within which is housed a spring valve assembly, and upon which is mounted a plunger assembly comprising a cap or bearing member 11 within which there slides a plunger 12, and which with the plunger, closes the outer end of the base portion.

The base has a bore in its back end, hereinafter referred to as a supply chamber 13, threaded to receive the end of the pipe with which it is to be connected. The base is also threaded at the other end upon its outer surface at 14 to fit within a threaded bore 15 in the adjacent end of the cap 11.

The base 10 is provided with a bore 16 in the front end which communicates with the supply chamber through an annular flange 17.

The spring assembly comprises a rod 18 disposed axially within bore 16, upon which there slides a gasket 19. Solely for the purpose of convenience of language we shall refer to this gasket as a base gasket.

I prefer to confine the gasket 19 between a small washer 20 and a larger washer 21. The rod has an out-turned flange 22 to keep it from pulling out of washer 20. The washer 21 preferably has its central portion 23 made to a diameter a little larger than washer 20, offset away from the gasket to press the peripheral portion of the gasket against flange 17 as a valve seat.

Surrounding the rod 18 beyond washer 21 is a spring 24 confined by a washer 25 which also has an offset center 25a, the spring ends fitting around these offset centers to hold the spring centered.

The back end of rod 18 is bored out as shown at 28, and this bore communicates with a port 29 in the wall of the bore at a point beyond washer 21. Thus this port forms, with the gasket, a valve held in assembled relation in the spring assembly; so that by replacement of the spring assembly the new parts are brought into operative relation without adjustment.

The rod 18 is provided with a circumferential groove 26 to receive a slotted washer 27 which is of a diameter to fit within an offset center 25a of the washer 25. With this construction, it is possible to assemble this spring assembly, merely by placing the washer 20, gasket 19, washer 21, spring 24, and washer 25 upon the rod 18, and then depressing the washer 25 to compress the spring 24 until the slotted washer 27 is inserted in groove 26, whereupon all parts are held in their assembled position. The protruding centers of washers 21 and 25 serve to maintain the spring 24 in its coaxial position.

The plunger 12 is cylindrical and slides within a bearing 11a in cap 11. It has a central bore 30, the front portion of which serves as the soap outlet and discharges into a protruding spout 31. A knob 31a is provided on the outer end of the plunger, which may be held in place by the spout 31.

The central bore 30 is enlarged at 32 to accommodate a spring 33 which presses a ball 34 against a seat 35 upon a screw 36 which is threaded at 37 into the bore. The bore 30 of the plunger is still further enlarged beyond the threaded portion 37 to provide an annular channel 38 between the wall of the bore and a cylindrical portion of screw 36.

Screw 36 has a central bore 39 in its outer end which can be closed at its outer end by the ball 34 and its other end communicates by a hole 40 in its wall, with the channel 38. This channel connects also with holes 41 in the plunger.

A gasket 42 is interposed between the base and cap member. This gasket, for convenience of language only, we will refer to as a plunger gasket. It fits snugly around the plunger 12 in position to open or close holes 41 as the plunger slides, and it has a transverse face 43 adapted to be engaged by a head 44 on screw 36.

The parts are so proportioned that when the device is assembled, the head 44 bears against washer 25, slightly depressing it, thus causing spring 24 to press base gasket 19 against flange 17 and also to press head 44 against plunger gasket 42.

The cap is provided with a longitudinal groove 46 and the plunger with a mating recess 45 to receive a ball 47 in position to rotate within the groove 46 as the plunger slides in and out, to hold the plunger against rotation.

With the foregoing construction it will be clear that the spring assembly including rod 18, gasket 19, and associated parts constitutes a unitary structure containing the intake valve and washer 25 all in properly adjusted position, which may be taken out and replaced without requiring adjustment.

Similarly, the plunger assembly comprising cap 11, the plunger, check valve, control valve comprising openings 41 and gasket 42, and head 44, are also held in operative relation as a unit. This entire assembly may be replaced as a unit or the assembled plunger may be replaced as a unit without any adjustments being necessary.

At the same time either of these units may be dis-assembled to clean or replace parts, with the greatest of ease.

The operation of the device will be clear from the above description. The plunger 12 is normally held in the out position as shown by spring 24, at which time the bore 16 is in communication with the supply chamber through bore 28 and port 29.

When, however, the patron pushes the cylinder in, head 44, already in engagement with washers 25 and 27, pushes rod 18 into the supply chamber, thereby causing port 29 to pass into gasket 19 which closes it, shutting off communication with the supply. At the same time, head 44 rises off of surface 43 and ports 41, pass out from the gasket, permitting soap, compressed by the movement of the plunger into bore 16 to pass through ports 41, channel 38, port 40, bore 39, past valve 34 to discharge spout 31.

As soon, however, as the plunger is released, it is forced out by spring 24, closing check valve 34, and bringing bore 16 to a reduced pressure. As ports 41 are closed by plunger gasket 42, port 29 is opened by base gasket 19, whereupon soap is sucked or permitted to flow into bore 16, ready for the next operation.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. A soap dispenser comprising a base having at its rear end a supply chamber adapted to be connected to a soap supply, and at its front end a bore, and having an annular flange separating said chamber from said bore, a spring assembly inserted within said bore including a base gasket adapted to rest against said annular flange and having a central opening, an axially disposed rod slidable in said opening and having an outwardly extending flange on its rear end to prevent its pulling out of said gasket, a spring retaining washer upon the other end of said rod, a spring compressed between said base gasket and said retaining washer, said rod having a bore in its rear end terminating in a port in the side of said rod at a point normally within said bore, affording communication from said soap supply chamber to said bore, said port being so positioned as to be closable by sliding said rod in said gasket, an annular cap attached to the front end of said base, a plunger gasket held by said cap against said base, a plunger assembly sliding within said cap and plunger gasket including a plunger having a central bore therein, terminating at the front end in a discharge spout, a screw held within said plunger having a central bore and a head positioned to contact said plunger gasket to close communication between said bore and the interior of the said plunger, and to engage said retaining washer and to engage said rod when said plunger is pushed in, so that the movement of the plunger will move the rod to close the port in the side of said rod, and press said head away from said plunger gasket, said plunger having a central bore leading from its interior and terminating in a lateral hole normally closed by said plunger gasket, but openable by the sliding of said plunger within said plunger gasket.

2. A device according to claim 1 having a washer with an off-set center lying upon said base gasket, and in which the means for connecting the rod to the spring comprises another washer having an offset center, said centers lying within the end coils of the said spring, and said rod having a circumferential groove near its front end, a slotted washer engaging said groove and fitting within the offset formed by said last named offset center.

3. A device according to claim 1 having between said base gasket and said annular flange a washer of small diameter and having on the other side of said gasket a washer of larger diameter having its center offset away from said gasket substantially of the diameter of said first mentioned washer, and in which the means for connecting the spring to the rod includes a washer having an offset center, said offset centers lying within the coils of said spring to center the spring, said rod having a circumferential groove near the plunger assembly end, a slotted washer fitting within said groove and within the hollow formed by said last named offset center.

4. A device according to claim 1 in which the bore in said plunger includes an annular channel between said screw and said plunger, and said screw has an opening through its walls between said central bore in said screw and said annular channel.

5. A device according to claim 1 in which the screw is provided with a projecting head in position to engage upon its outer face a transverse inner face of said plunger gasket and is positioned to be urged against said gasket by said spring which surrounds said rod, to make a tight closure between said bore in said base and the interior of said plunger.

6. A soap dispensing valve comprising in combination a base having in its rear end a supply chamber adapted to be attached to a soap supply, and a bore in its front end, an annular flange on said base through which said supply chamber and said bore are connected, a spring assembly within said bore including a base gasket engaging said flange having a central opening, a rod sliding in said opening having an axial bore of greater length than the thickness of said gasket, having an opening through its wall beyond said gasket affording communication between said supply chamber and said bore, a washer held near the front end of said rod, a spring compressed between said gasket and said washer, an out-turned flange upon said rod beyond said gasket to limit the expansion of said spring, a cap for said valve, a plunger gasket clamped between said base and said cap, a plunger of larger diameter than said rod, slidable in said cap and in an opening in said plunger gasket and having a central bore and openings in its lateral walls communicating with said last named central bore, said openings being in position to be closed by said plunger gasket, and opened by the movement of said plunger in said plunger gasket, a check valve within said last named bore, a screw within said last named bore having a central opening to engage the front end of said rod, and having a head positioned to engage said washer as the plunger is pushed in, to slide said rod in said first named base gasket, said head being of a size nearly but not quite equal to the diameter of said bore in said base and being adapted to engage said second named gasket, and a discharge spout upon said plunger.

7. A soap dispenser comprising a base having a supply chamber adapted to be connected to a soap supply and having an annular flange and a bore communicating with said chamber through said annular flange, a rod within said bore slidable within said annular flange having a bore in one end affording communication between said first mentioned bore and said chamber, through a lateral opening and closable by said annular flange on sliding said rod into said chamber a predetermined distance, a washer affixed near the other end of said rod, and a spring compressed between said annular flange and said washer, a cap attached to said base, a plunger gasket clamped between them, a plunger of larger diameter than said rod sliding in said cap, a screw within said plunger having a central opening to receive and center the front end of said rod, and a head to engage said washer to move said rod, and said plunger having a discharge spout at its other end and an inlet port in the side of the end thereof in position to be engaged by said plunger gasket so as to be closed thereby when said plunger is in an out position, a channel formed in said plunger connecting said discharge spout and inlet port, and a spring pressed check valve in said channel.

8. A device according to claim 7 in which said screw is provided with a central bore comprising a portion of said channel, and the end of said screw defining said bore comprises a valve seat for said check valve.

9. A valve assembly for a soap dispenser adapted for use within a base having a circumferential flange, comprising in combination a rod having a circumferential flange at one end and a groove adjacent to the other end, valve devices surrounding said rod including a base gasket slidable upon the flange end of said rod and held against sliding off by said flange, a slotted washer slidable into and normally resting in the groove on the other end of said rod, a pair of washers slidable on said rod having their peripheries offset away from each other, one normally resting upon said base gasket and the other normally engaging said slotted washer, a spring engaging the offset peripheries and being compressed between them, said rod having a passageway from its flanged end terminating in a port in the side wall, at a point normally on the other side of the gasket whereby a depression of said rod relative to said gasket will close said port when said port reaches said gasket.

10. A valve assembly for a soap dispenser comprising in combination a rod having a circumferential flange at one end and a groove adjacent to the other end, valve devices surrounding said rod, including in the order named, starting from the flanged end, a base gasket, a first washer, a spring, a second washer, and a slotted washer, said first and second washers each having its central portion offset toward the other relative to the periphery thereof, said spring extending between said first and second washers and surrounding the offset central portion of each, said slotted washer lying beyond the said spring and said first and second washers and fitted within said groove and within the offset center of the second washer, the movement of said base gasket upon said rod being limited by said circumferential flange to hold said spring in compression, said rod having, extending inwardly from the flanged end, a central bore of greater depth than the thickness of the base gasket, and there being a port through the wall surrounding said bore at a point normally beyond said base gasket.

11. A device according to claim 9 in which the slotted washer is of a size within the offset center of the adjacent washer, whereby it is held in position by the tension of the spring.

12. A plunger assembly for a soap dispenser comprising a cylindrical plunger having a central bore therein, and a discharge port at its front end, a screw screwing into the back end of said bore, and in turn having a central bore, and a valve seat at the end of said bore, a spring pressed ball valve within the bore of said plunger in position to engage the said valve seat, the wall of said screw having an opening therethrough at the bottom of its bore, the bore of said plunger being of larger diameter than said screw opposite said opening, the wall of said plunger having an opening therethrough adjacent to its outer end, at the point of larger diameter and said screw having a head projecting radially outward from said plunger.

13. A device according to claim 12 in combination with a cap member having a bore therein in which said plunger slides, and an axial groove serving as a key-way in said bore of said cap member, and said plunger having a recess in its outer wall to receive a ball, a gasket within said cap member in position to be engaged by said head, said ball recess being so positioned relative to said gasket and head that said ball is held in said groove by said head in all positions of the plunger.

14. A soap dispenser comprising a cylindrical base, having a rear supply chamber to receive a supply pipe, and a front bore communicating with said supply chamber by a central opening surrounded by an annular flange, a spring valve assembly within said front bore comprising an axial rod having an out turned flange on the rear end and a circumferential slot near its front end, a gasket surrounding said rod, said rod being held within said gasket by said flange, and a washer on the front end of said rod, a spring surrounding said rod, compressed between said gasket, and said washer, and a slotted washer on said rod in front of said first mentioned washer and engaging said slot to retain said slotted washer in place, said rod having a bore from its flanged end to a point normally beyond said gasket, and terminating at a point where it will be closed by the movement of said rod within the gasket, a plunger element having a hollow interior communicating with a discharge spout mounted on the outer end of the base in a position to cause the pressing in of the plunger to press the front washer in to move said rod inwardly, and means to hold said base and spring valve assembly in assembled relation.

15. A valve assembly for a soap dispenser comprising in combination, a rod having a circumferential flange on one end and a circumferential groove near the other, a gasket upon said rod adjacent to said flange, a washer having its center offset away from said flange, bearing against the gasket, a second washer upon said rod having its center offset toward said flange, a spring between said washers surrounding said offset centers, and a slotted washer engaging said slot and fitting within said second washer to hold said spring under compression, said rod having a bore therein affording communication from one side of said gasket to the other, and being closable by movement of said rod in said gasket.

WILLIAM J. DOBKIN.

REFERENCES CITED

The following references are of record in the file of this patent:

UNITED STATES PATENTS

| Number | Name | Date |
|---|---|---|
| 1,884,750 | Koppleman et al. | Oct. 25, 1932 |
| 2,184,439 | Schwarcz | Dec. 26, 1939 |